(12) United States Patent
Harano et al.

(10) Patent No.: US 10,088,366 B2
(45) Date of Patent: Oct. 2, 2018

(54) HUMAN BODY DETECTING DEVICE

(71) Applicant: PANASONIC INTELLECTUAL PROPERTY MANAGEMENT CO., LTD., Osaka (JP)

(72) Inventors: Yoshihiko Harano, Osaka (JP); Yusuke Hashimoto, Osaka (JP); Tomohiro Kamitsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/559,352

(22) PCT Filed: Mar. 11, 2016

(86) PCT No.: PCT/JP2016/001372
§ 371 (c)(1),
(2) Date: Sep. 18, 2017

(87) PCT Pub. No.: WO2016/157755
PCT Pub. Date: Oct. 6, 2016

(65) Prior Publication Data
US 2018/0113028 A1 Apr. 26, 2018

(30) Foreign Application Priority Data
Mar. 31, 2015 (JP) .................. 2015-071301

(51) Int. Cl.
*G01J 5/00* (2006.01)
*G01J 5/08* (2006.01)
(Continued)

(52) U.S. Cl.
CPC ............. *G01J 5/0809* (2013.01); *G01J 1/04* (2013.01); *G01V 8/12* (2013.01); *G02B 3/0037* (2013.01)

(58) Field of Classification Search
CPC ......... G01J 5/34; G08B 13/191; G08B 13/19; G08B 29/188; G08B 13/193
See application file for complete search history.

(56) References Cited

U.S. PATENT DOCUMENTS

| 3,829,693 A | * | 8/1974 | Schwarz | G08B 13/193 250/332 |
| 4,874,063 A | * | 10/1989 | Taylor | B66B 5/0006 187/391 |

(Continued)

FOREIGN PATENT DOCUMENTS

| EP | 2 157 413 A1 | 2/2010 |
| JP | H09-145480 A | 6/1997 |

(Continued)

OTHER PUBLICATIONS

International Search Report and Written Opinion issued in International Patent Application No. PCT/JP2016/001372, dated Mar. 11, 2016; with partial English translation.

(Continued)

*Primary Examiner* — Kiho Kim
(74) *Attorney, Agent, or Firm* — McDermott Will & Emery LLP

(57) ABSTRACT

The present disclosure provides a human body detecting device capable of increasing the sensitivity. Multiple first infrared ray reception paths are defined by any one of multiple lenses and multiple detecting units. Multiple second infrared ray reception paths are defined by one lens adjacent to the any one of multiple lenses and multiple detecting units. Lens array is configured so that one of multiple first infrared ray reception paths and one of multiple second infrared ray reception paths overlap with each other. The front-side electrodes of detecting units respectively corresponding to one first infrared ray reception path and one second infrared ray reception path of the multiple detecting units have the same polarity.

12 Claims, 17 Drawing Sheets

(51) Int. Cl.
G02B 3/00 (2006.01)
G01V 8/12 (2006.01)
G01J 1/04 (2006.01)

(56) References Cited

U.S. PATENT DOCUMENTS

| | | | |
|---|---|---|---|
| 2004/0129883 A1* | 7/2004 | Dougherty | G08B 13/191 250/338.3 |
| 2005/0040947 A1* | 2/2005 | Buckley | G01J 5/34 340/567 |
| 2010/0176300 A1 | 7/2010 | Nishikawa et al. | |
| 2013/0126739 A1 | 5/2013 | Oi et al. | |

FOREIGN PATENT DOCUMENTS

| | | |
|---|---|---|
| JP | H11-072386 A | 3/1999 |
| JP | 2000-329860 A | 11/2000 |
| JP | 2001-272274 A | 10/2001 |
| JP | 2010-117264 A | 5/2010 |
| JP | 2012-145562 A | 8/2012 |
| WO | 2014/006388 A1 | 1/2014 |

OTHER PUBLICATIONS

Partial Supplementary European Search Report issued in European Application No. EP 16 77 1649 dated Apr. 10, 2018.

* cited by examiner

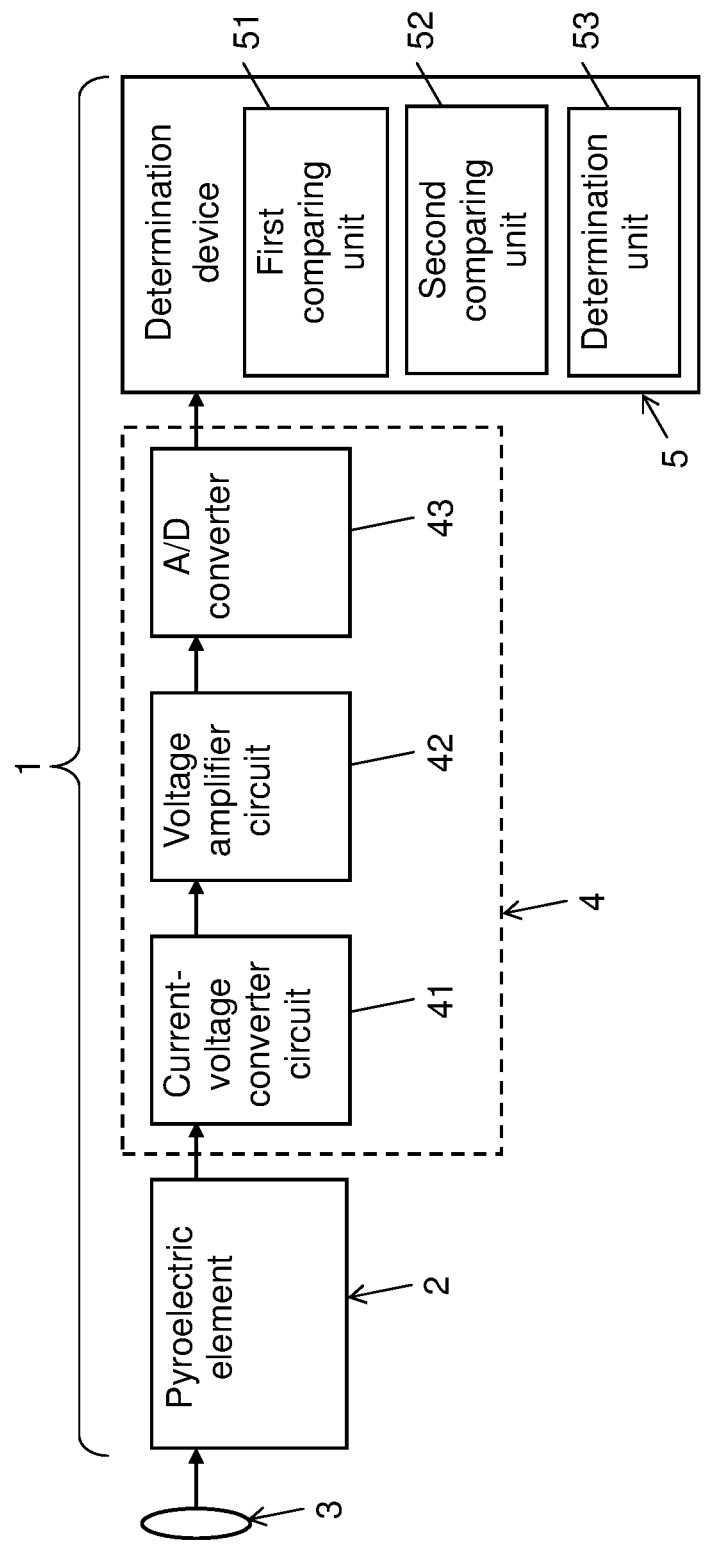

HUMAN BODY DETECTING DEVICE

RELATED APPLICATIONS

This application is the U.S. National Phase under 35 U.S.C. § 371 of International Patent Application No. PCT/JP2016/001372, filed on Mar. 11, 2016, which in turn claims the benefit of Japanese Application No. 2015-071301, filed on Mar. 31, 2015, the entire disclosures of which Applications are incorporated by reference herein.

TECHNICAL FIELD

The present disclosure relates to a human body detecting device, more particularly to an infrared human body detecting device that includes a pyroelectric element detecting infrared rays emitted from human bodies.

BACKGROUND ART

Examples of such type of human body detecting device include an infrared human body detector that includes a pyroelectric element and an optical system disposed ahead of the photosensitive surface of the pyroelectric element (refer to patent literature 1).

A pyroelectric element includes multiple elements (detecting unit) having output voltage polarities different from each other. The optical system includes a mirror and a lens body (a lens array). The lens body includes multiple lenses.

In the above-described infrared human body detector, output of the pyroelectric element is amplified by the amplification unit, the output is passed through a bandpass filter, and then determination is made by the comparator circuit whether or not the output level is higher than a reference level. This allows the infrared human body detector to detect the existence and/or motion of a person.

A human body detecting device sometimes cannot detect the motion of a person when they move from the outside of a detection area into the detection area, and thus increasing the sensitivity has been requested.

CITATION LIST

Patent Literature

PTL 1: Japanese Patent Unexamined Publication No. 2000-329860

SUMMARY

An object of the present disclosure is to provide a human body detecting device with increased sensitivity.

A human body detecting device according to one aspect of the present disclosure includes a pyroelectric element, a lens array having multiple lenses collecting infrared rays onto the pyroelectric element, and a determination device that outputs a human body detection signal based on the output signal of the pyroelectric element. The pyroelectric element includes multiple detecting units each having a front-side electrode and a back-side electrode. The pyroelectric element includes a first detecting unit with the polarity of its front-side electrode positive and a second detecting unit with its polarity of the front-side electrode negative, as the multiple detecting units. In the human body detecting device, multiple infrared ray reception paths are defined by one lens and the multiple detecting units in one-to-one correspondence to the multiple detecting units for each of the multiple lenses. The multiple infrared ray reception paths include multiple first infrared ray reception paths that are defined by any one of the multiple lenses and the multiple detecting units; and multiple second infrared ray reception paths that are defined by a lens adjacent to the any one of the multiple lenses and the multiple detecting units. The lens array is configured so that one of the multiple first infrared ray reception paths and one of the multiple second infrared ray reception paths overlap with each other. With the two paths, the front-side electrodes of two of the multiple detecting units corresponding to the one first infrared ray reception path and to the one second infrared ray reception path have the same polarity.

BRIEF DESCRIPTION OF DRAWINGS

FIG. 1 is a block diagram of a human body detecting device according to the first embodiment of the present disclosure.

DESCRIPTION OF EMBODIMENTS

The respective figures illustrated in the embodiments first through third are schematic and the ratios of the size and thickness of each component in the figures do not necessarily reflect actual proportion.

First Exemplary Embodiment

Hereinafter, a description is made of human body detecting device 1 of the embodiment based on FIGS. 1, 2A, 2B, 3, 4, 5A, 5B, 6, 7, and 8.

Figure 2A:
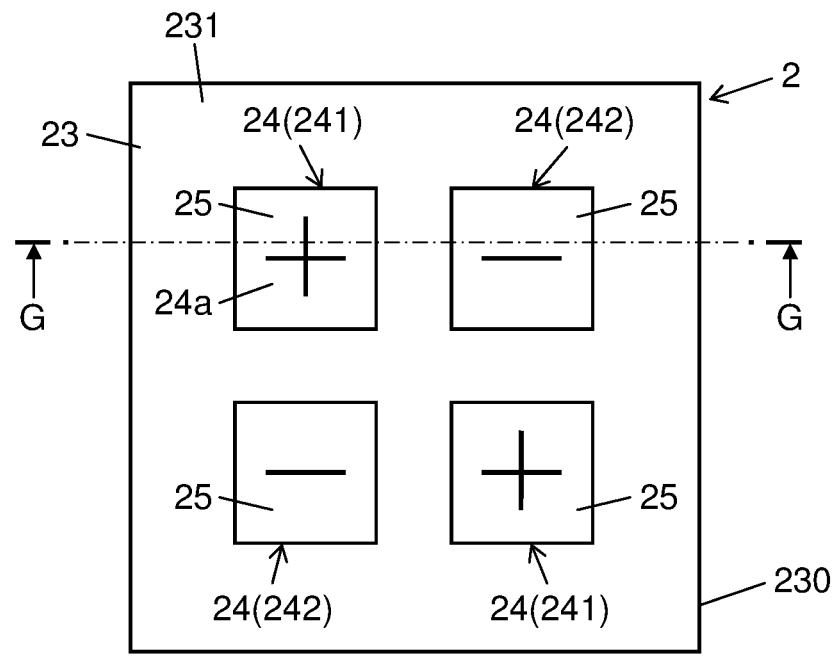
FIG. 2A is an outline plan view of the pyroelectric element of the human body detecting device.
Figure 2B:
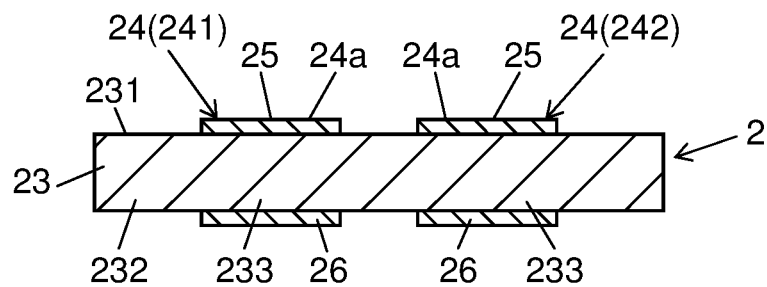
FIG. 2B is an outline sectional view taken along line G-G in FIG. 2A.
Figure 4:
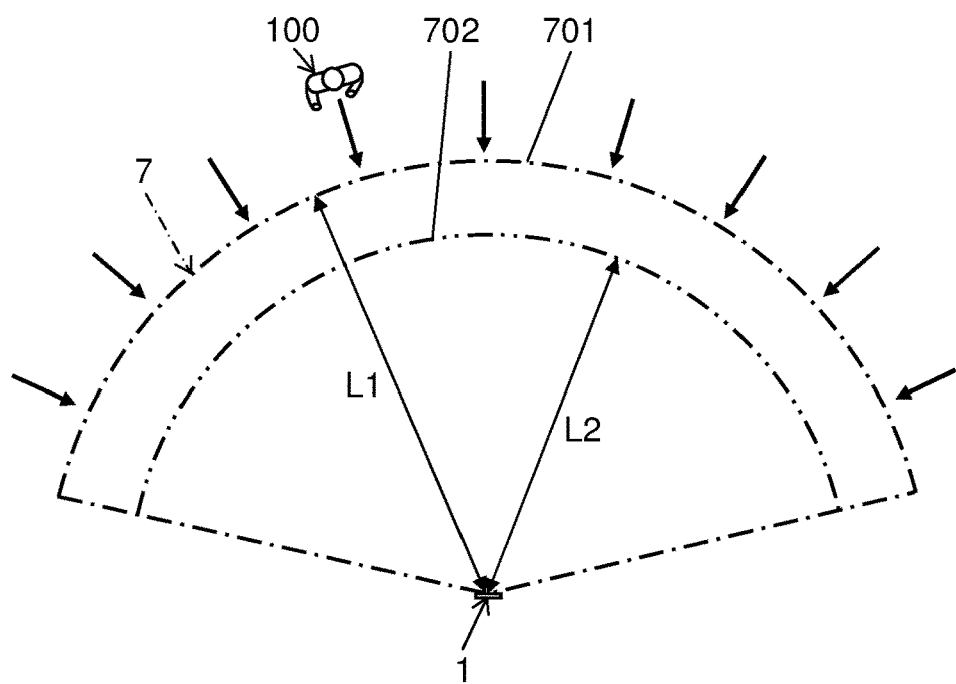
FIG. 4 illustrates the detection area of the human body detecting device.
Figure 5A:
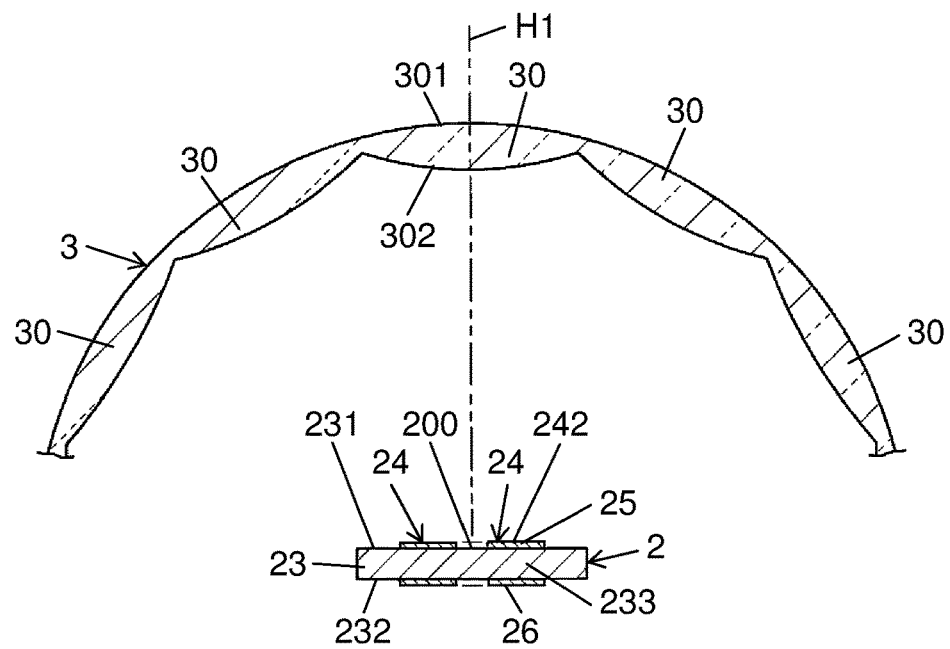
FIG. 5A is an outline transverse cross-sectional view of the pyroelectric element and the lens array of the human body detecting device.
Figure 5B:
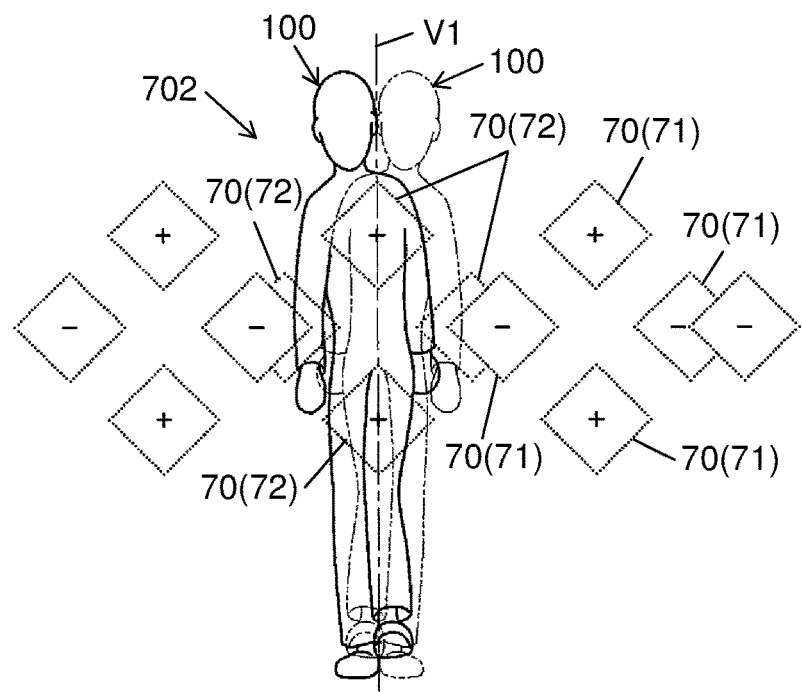
FIG. 5B illustrates infrared ray reception paths of the human body detecting device.

As shown in FIG. 1, human body detecting device 1 includes pyroelectric element 2, lens array 3, and determination device 5. As shown in FIGS. 2A and 2B, pyroelectric element 2 includes multiple (e.g., four) detecting units 24 each having front-side electrode 25 and back-side electrode 26. Pyroelectric element 2 includes first detecting unit 241 with the polarity of front-side electrode 25 positive and second detecting unit 242 with the polarity of front-side electrode 25 negative, as multiple detecting units 24. As shown in FIG. 5A, lens array 3 includes multiple (e.g., five) lenses 30 that collect infrared rays onto pyroelectric element 2. Determination device 5 is configured to output a human body detection signal based on an output signal of pyroelectric element 2. In human body detecting device 1, multiple (e.g., 5×4=20) infrared ray reception paths 70 are defined by each of multiple lenses 30 and multiple detecting units 24. More specifically, for each of multiple (e.g., five) lenses 30, multiple (four) infrared ray reception paths 70 are defined by one lens 30 and multiple (e.g., four) detecting units 24 in one-to-one correspondence to multiple (four) detecting units 24. Multiple infrared ray reception paths 70 include multiple (e.g., four) first infrared ray reception paths 71 that are defined by any one of multiple lenses 30 and multiple detecting units 24; and multiple (e.g., four) second infrared ray reception paths 72 that are defined by one lens 30 adjacent to the any one of multiple lenses 30 and multiple detecting units 24. As shown in FIG. 5B, lens array 3 is configured so that one of multiple first infrared ray reception paths 71 and one of multiple second infrared ray reception paths 72 overlap with each other. With the two paths, the front-side electrodes of two of the multiple detecting units 24 corresponding to one first infrared ray reception path 71 and to one second infrared ray reception path 72 have the same polarity. Human body detecting device 1 of the configuration described above provides increased sensitivity. As schematically shown in FIG. 4, detection area 7 of human body detecting device 1 is defined by maximum detection distance L1. The term "maximum detection distance L1" means a maximum value of the distance at which person (human body) 100 can be detected within detection area 7 of human body detecting device 1. In other words, "maximum detection distance L1" is the distance between human body detecting device 1 and the farthest point at which human body detecting device 1 can detect person 100. FIG. 4 schematically shows detection area 7 within a horizontal plane, where detection area 7 is not actually visible. One first infrared ray reception path 71 and one second infrared ray reception path 72 described above, overlapping with each other, overlap independently of the distance from human body detecting device 1. Hence, the two paths overlap on first virtual plane 701 defined by maximum detection distance L1 in detection area 7, as well as on second virtual plane 702 closer to human body detecting device 1 than first virtual plane 701 for example. Given distance L2 from human body detecting device 1 to second virtual plane 702 is set to a constant value. Given distance L2 may be any value as long as it is maximum detection distance L1 or smaller, and may vary depending on the direction in which second virtual plane 702 is viewed from human body detecting device 1. In other words, second virtual plane 702 may be flat as well as curved. Maximum detection distance L1 tends to be shorter for a higher temperature of a space defining detection area 7. In short, maximum detection distance L1 changes depending on the temperature for example in the periphery (a space including detection area 7) of human body detecting device 1, and thus is favorably set based on the highest temperature within a given operating temperature range.

To solve technological challenges of increasing the sensitivity of an existing human body detecting device when it detects the motion of a person when they move from the outside of a detection area into the detection area, the inventors studied hard about the motion of persons focusing attention on it. As a result, the inventors have learned that the body axis tends to shake from side to side while a person is walking straight. The inventors have also learned that an output signal of a pyroelectric element periodically changes when a person moves from the outside of a detection area into the detection area toward the human body detecting device.

To increase the sensitivity of an existing infrared human body detector, the inventors attempted to lower the reference level used by a comparator circuit. This case, however, has proved that the detection accuracy is impaired due to a heat source (e.g., an air conditioner) except a person.

On the other hand, human body detecting device 1 of the above-described configuration is capable of increasing the density of multiple infrared ray reception paths 70, thereby raising the sensitivity while suppressing the decrease of the detection accuracy.

Favorably, human body detecting device 1 further includes signal processing circuit 4. Signal processing circuit 4 is configured to process an output signal of pyroelectric element 2 to output a voltage signal proportional to the output signal. Determination device 5 is favorably configured to output a human body detection signal based on the level of the voltage signal output from signal processing circuit 4. In this case as well, determination device 5 is configured to output a human body detection signal based on an output signal of pyroelectric element 2.

A voltage signal output from signal processing circuit 4 is a signal with its polarity (sign, +/−) and instantaneous value determined by the difference from a certain reference voltage level.

FIG. 4 schematically shows detection area 7 of human body detecting device 1 according to the embodiment with dashed-dotted lines. As an example, detection area 7 is set to a fan-shaped range centering on human body detecting device 1 in a planar view. Detection area 7 is defined by multiple infrared ray reception paths 70.

In FIG. 4, the direction in which person 100 moves from the outside of detection area 7 into detection area 7 toward human body detecting device 1 is schematically indicated by a heavy-line arrow.

FIG. 5B schematically shows multiple infrared ray reception paths 70 on a semicylindrical virtual screen assumed to be at the front side of human body detecting device 1. The virtual screen is assumed to be positioned at the arc of a fan shape corresponding to a given range within maximum detection distance L1. The fan shape is set to a central angle of 160 degrees and a radius of 2 m as an example. In other words, the given range is set to a horizontal viewing angle of 160 degrees and to given distance L2 of 2 m. The central angle of the fan shape is determined mainly by the shape of lens array 3. The distance between human body detecting device 1 and the virtual screen (second virtual plane 702) is set to the same value as given distance L2.

Figure 7:
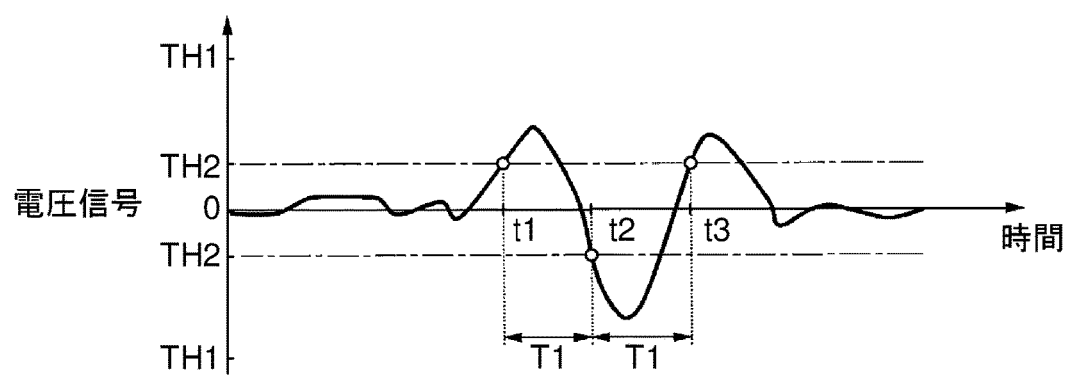
FIG. 7 illustrates the operation of the determination device of the human body detecting device.

FIG. 7 schematically shows an example waveform of a voltage signal output from signal processing circuit 4 when person 100 outside detection area 7 of human body detecting device 1 walks toward human body detecting device 1 to enter the inside of detection area 7, with the above-described reference voltage level as a zero level. A human body detection signal output from determination device 5 based on the level of a voltage signal output from signal processing circuit 4 is assumed to be a pulse signal at the high level for a certain period of time as an example. Thus, output of determination device 5 is at the low level while a human body detection signal is not being output; otherwise, at the high level.

Each component of human body detecting device 1 is described below in more detail.

Figure 3:
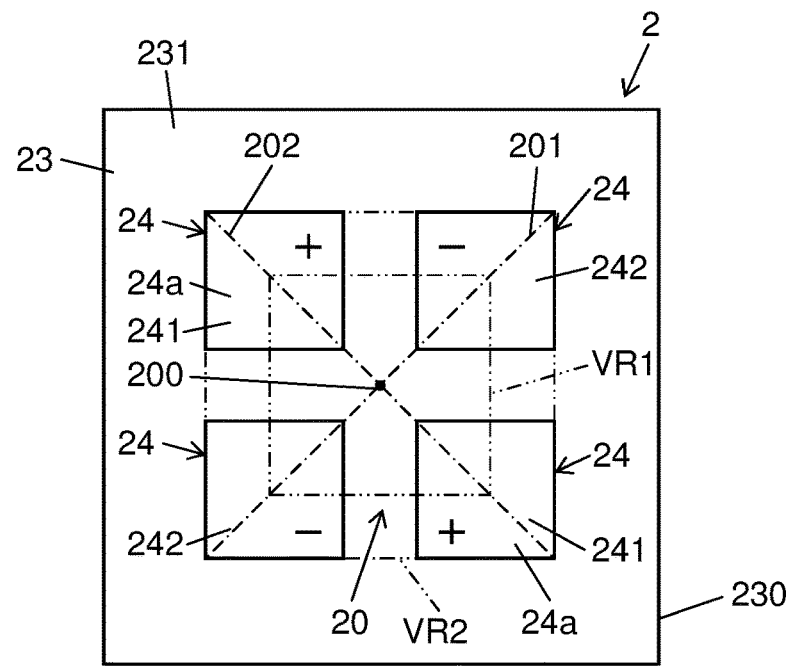
FIG. 3 schematically illustrates the photosensitive surface of the pyroelectric element of the human body detecting device.

Pyroelectric element 2 is a quad element having four detecting units 24 on one pyroelectric substrate 23 as shown in FIGS. 2A, 2B, and 3 for example.

Pyroelectric element 2 has four detecting units 24 on one pyroelectric substrate 23 in an array (a matric shape) of 2 by 2. In other words, pyroelectric element 2 has four detecting unit 24 arranged in a 2-by-2 matrix.

Pyroelectric substrate 23 is square-shaped in a planar view. Pyroelectric substrate 23 has pyroelectricity, formed of a monocrystal $LiTaO_3$ substrate for example.

Each planar view of multiple detecting units 24 is square-shaped. In pyroelectric element 2, the centers of detecting units 24 are positioned at the respective four corners of virtual square VR1 (refer to FIG. 3) inside outer peripheral line 230 of pyroelectric substrate 23 at the central part of pyroelectric substrate 23.

Each of multiple detecting units 24 is a capacitor including front-side electrode 25 formed on front surface 231 of pyroelectric substrate 23, back-side electrode 26 formed on back surface 232 of pyroelectric substrate 23, and part 233 of pyroelectric substrate 23 flanked by front-side electrode 25 and back-side electrode 26. In FIG. 2A, the polarity of front-side electrode 25 of each of multiple detecting units 24 close to lens array 3 is indicated by the sign of "+" or "−". Each photosensitive surface 24a of multiple detecting units 24 is the front surface of front-side electrode 25.

As described above, pyroelectric element 2 is a quad element having four detecting units 24 arranged in an array of 2 by 2. Pyroelectric element 2 has rectangular photosensitive surface 20 (refer to FIG. 3) encompassing respective front-side electrodes 25 of multiple detecting units 24 in a planar view. Here, "rectangular" refers to a rectangular quadrangle including a rectangle and a square. FIG. 3 exemplifies square photosensitive surface 20 as rectangular photosensitive surface 20. Of four detecting units 24 arranged in a 2-by-2 array in pyroelectric element 2, two detecting units 24 disposed along first diagonal line 201 of rectangular photosensitive surface 20 are connected in parallel with each other; two detecting units 24 disposed along second diagonal line 202 of rectangular photosensitive surface 20 are connected in parallel with each other; two detecting units 24 disposed in the row direction are connected in reverse parallel with each other; and two detecting units 24 disposed in the column direction are connected in reverse parallel with each other. In pyroelectric element 2, respective front-side electrodes 25 of two detecting units 24 disposed along first diagonal line 201 have the same polarity. In pyroelectric element 2, respective front-side electrodes 25 of two detecting units 24 disposed in the row direction have polarities different from each other. In pyroelectric element 2, respective front-side electrodes 25 of two detecting units 24 disposed in the column direction have polarities different from each other. One first infrared ray reception path 71 and one second infrared ray reception path 72, overlapping with each other, correspond to detecting units 24 different from each other. This allows human body detecting device 1 to increase its sensitivity. In this patent description, "the row direction" refers to a first direction (the right-and-left direction in FIG. 3) along one side of the four sides of rectangular photosensitive surface 20. The term "the column direction" refers to a second direction (the up-and-down direction in FIG. 3) orthogonal to the thicknesswise direction of pyroelectric element 2 and to the first direction.

Photosensitive surface 20 of pyroelectric element 2 refers to the front surface of a region enclosed by the outer peripheral line of convex polygonal VR2 encompassing respective photosensitive surfaces 24a of multiple detecting units 24. Convex polygonal VR2 in FIG. 3 is rectangular. Normal line H1 (refer to FIG. 5A) passing through center 200 of photosensitive surface 20 of pyroelectric element 2 can be regarded as the optical axis of pyroelectric element 2.

Favorably, pyroelectric element 2 is disposed with the direction along first diagonal line 201 of rectangular photosensitive surface 20 as the right-and-left direction. In this case, pyroelectric element 2 faces lens array 3 in a state rotated by 45° clockwise in a planar view from the state shown in FIGS. 2A and 3 (refer to FIG. 5A). This allows human body detecting device 1 to narrow the gap between two infrared ray reception paths 70 adjacent to each other in the right-and-left direction, thereby increasing the sensitivity.

As shown in FIG. 5A, lens array 3 is disposed ahead of pyroelectric element 2. The phrase "ahead of pyroelectric element 2" means ahead of pyroelectric element 2 in a direction along normal line H1 passing through center 200 of photosensitive surface 20 of pyroelectric element 2.

Lens array 3 is favorably designed so that the focal points of respective multiple lenses 30 close to pyroelectric element 2 are at the same position.

Infrared rays controlled by respective multiple lenses 30 of lens array 3 have a wavelength band of 5 μm to 25 μm for example.

A material of lens array 3 can be polyethylene for example. Lens array 3 can be formed by molding (e.g., injection molding, compression molding) for example. A material of lens array 3 can be polyethylene with a white pigment added for example. A white pigment is favorably an inorganic pigment such as titanium dioxide and zinc flower (zinc oxide).

Each of multiple lenses 30 of lens array 3 is a light-collecting, convex lens. Here, each of multiple lenses 30 is an aspheric lens. Each of multiple lenses 30 may be a Fresnel lens.

In lens array 3, first surface 301 that infrared rays enter is composed of a group of the respective light-incoming surfaces of multiple lenses 30. First surface 301 is part of a semi-cylindrical surface. In lens array 3, second surface 302 from which infrared rays are discharged is composed of a group of the respective light-outgoing surfaces of multiple lenses 30. Second surface 302 has asperities.

Detection area 7 (refer to FIG. 4) of human body detecting device 1 is determined by multiple (e.g., 20) infrared ray reception paths 70 (refer to FIG. 5B) for example defined by multiple (e.g., five) lenses 30 and multiple (e.g., four) detecting units 24. Each of multiple infrared ray reception paths 70 is a three-dimensional region that is formed by a pencil of infrared rays incoming to detecting unit 24 of pyroelectric element 2 through lens 30 extended in a direction opposite to the travelling direction of the infrared rays. In other words, infrared ray reception path 70 means an infrared rays passing region through which a pencil of infrared rays used for forming an image on photosensitive surface 24a of detecting unit 24 of pyroelectric element 2. Furthermore, an infrared ray reception path is an effective region for detecting infrared rays from a human body. Multiple infrared ray reception paths 70 are optically defined paths, not actually visible ones.

Figure 20:
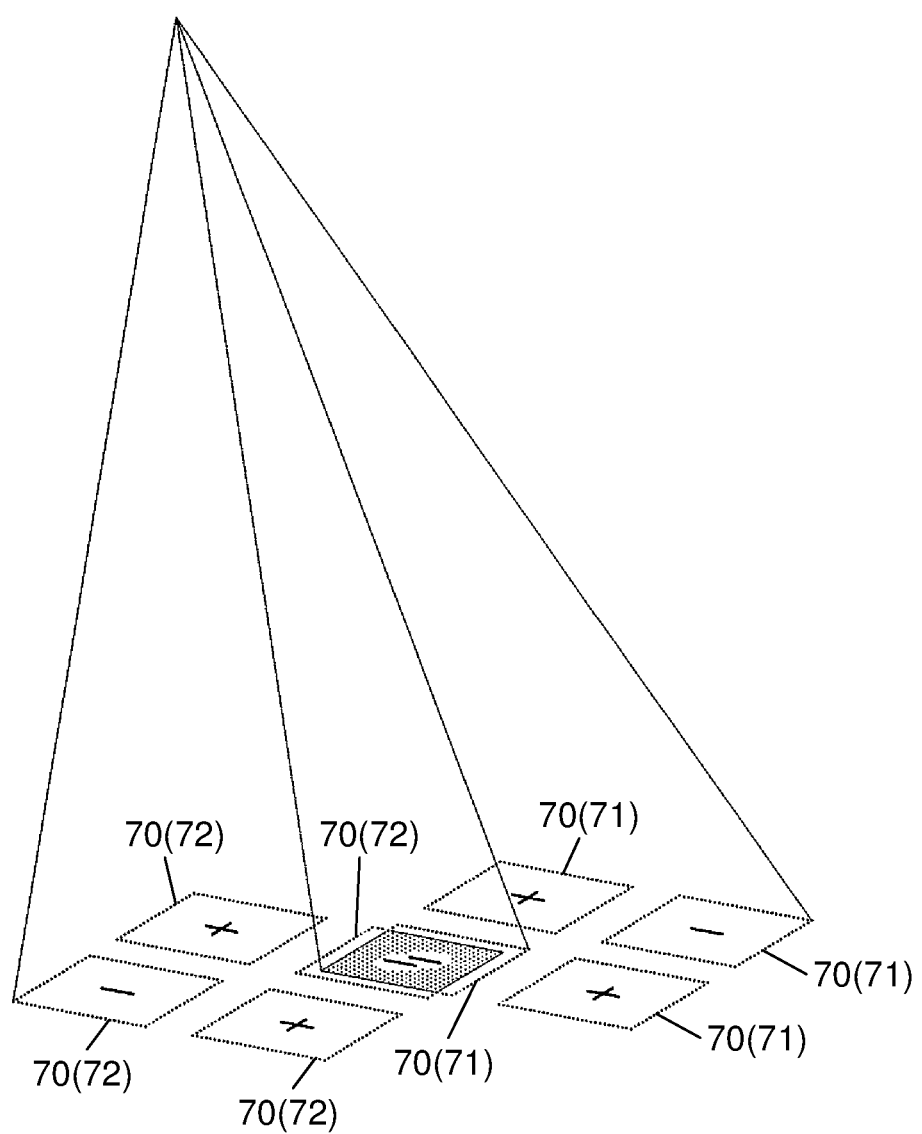
FIG. 20 illustrates infrared ray reception paths of the same human body detecting device.

Multiple infrared ray reception paths 70 can be substantially determined by pyroelectric element 2 and lens array 3. In more detail, detection area 7 of human body detecting device 1 has infrared ray reception paths 70 as many as detecting units 24 for each lens 30. Hence, if the number of lenses 30 of lens array 3 is five as shown in FIG. 5A, and if the number of detecting units 24 of pyroelectric element 2 is four as shown in FIGS. 2A and 2B, 20 pieces of infrared ray reception paths 70 can be formed. In human body detecting device 1, the shape of lens 30 determining infrared ray reception path 70 is set so that the front-view shape (refer to FIG. 5B) of infrared ray reception path 70 is substantially similar to the front-view (planar-view) shape of detecting unit 24. Hence, the front-view shape of infrared ray reception path 70 is square. The cross-sectional area of infrared ray reception path 70 through which a pencil of infrared rays can pass increases at greater distances from detecting unit 24. In FIG. 5B, the polarity of front-side electrode 25 of detecting unit 24 corresponding to each of multiple infrared ray reception paths 70 is indicated by the sign of "+" or "−". The sign "+" indicates positive polarity; "−", negative polarity. In short, each of multiple infrared ray reception paths 70 can be regarded to have polarity in one-to-one correspondence to detecting unit 24.

Lens array 3 is configured so that one of multiple first infrared ray reception paths 71 and one of multiple second infrared ray reception paths 72 overlap partially with each other. This allows human body detecting device 1 to increase the density of multiple infrared ray reception paths 70 than a case where one first infrared ray reception path 71 and one second infrared ray reception path 72 do not overlap with each other, and at the same time to increase the amount of infrared rays received by detecting unit 24 without the need for increasing the size of each of multiple lenses 30. Hence, human body detecting device 1 can increase its sensitivity even while suppressing upsizing of lens array 3. In human body detecting device 1, the area size of infrared ray reception path 70 overlapping with person 100 tends to increase when the body axis of person 100 inside detection area 7 shakes from side to side, or person 100 inside detection area 7 moves slightly (refer to FIG. 5B). Hence, human body detecting device 1 increases the level of an output signal of pyroelectric element 2. This allows human body detecting device 1 to increase the detection accuracy and the sensitivity.

Figure 6:
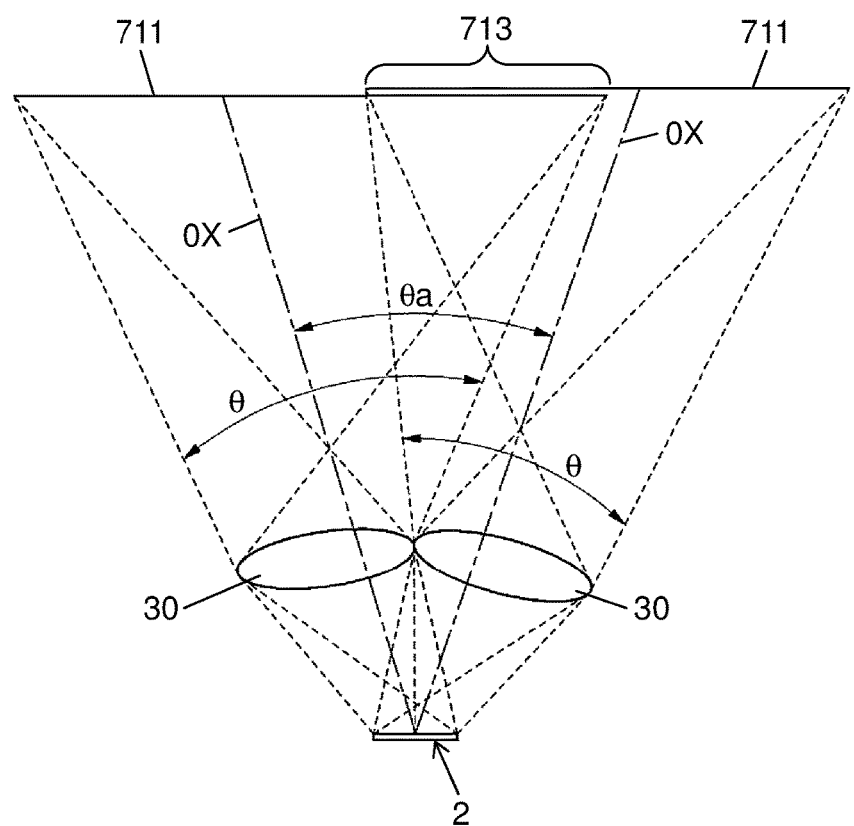
FIG. 6 schematically illustrates the principle of overlapping infrared ray reception paths of the human body detecting device.

In lens array 3, respective two lenses 30 adjacent to each other are aspheric as an example. In lens array 3, to overlap infrared ray reception paths 70, angle θa formed by optical axes OX of two adjacent lenses 30 is set to an angle smaller than angle θ (viewing angle) of view 711 that pyroelectric element 2 can view through lens 30, as shown in FIG. 6 for illustrating the principle. FIG. 6 schematically shows that view 711 viewed through one of adjacent lenses 30 and view 711 viewed through the other lens 30 overlap with each other in region 713 on second virtual plane 702 (refer to FIG. 4). In human body detecting device 1, lens array 3 has only to be designed so that one first infrared ray reception path 71 and one second infrared ray reception path 72 overlap with each other within region 713 for example.

In lens array 3, multiple lenses 30 are arranged in a row in a predetermined direction along first diagonal line 201 of rectangular photosensitive surface 20 of pyroelectric element 2. This allows human body detecting device 1 to increase the density of multiple infrared ray reception paths 70, and thus the sensitivity.

Human body detecting device 1 of the embodiment shown in FIG. 1 favorably includes a package accommodating pyroelectric element 2, signal processing circuit 4, and determination device 5. The package includes a package body accommodating pyroelectric element 2, an infrared transmissive component for plugging a window hole in the package body formed ahead of pyroelectric element 2, and multiple terminals. The package may be either what is called a can package or a surface-mounting package. A can package is also called a metal package. The multiple terminals include a terminal for extracting (outputting) a human body detection signal; a terminal for feeding, and a terminal for grounding. An infrared transmissive component may be a silicon substrate, or a germanium substrate for example. The infrared transmissive component favorably includes an appropriate optical filter film and antireflection film for example.

Multiple infrared ray reception paths 70 in detection area 7 (refer to FIG. 4) of human body detecting device 1 can be substantially determined by pyroelectric element 2 and lens array 3 as described above. However, if human body detecting device 1 includes a package, infrared ray reception paths 70 can vary depending on the size and shape of the infrared transmissive component, and the opening shape of the window hole for example.

Signal processing circuit 4 that processes an output signal of pyroelectric element 2 and outputs a voltage signal proportional to the output signal includes current-voltage converter circuit 41 and voltage amplifier circuit 42.

Current-voltage converter circuit 41 converts a current signal, which is an output signal of pyroelectric element 2, to a voltage signal and outputs the voltage signal. Current-voltage converter circuit 41 includes an operational amplifier. Current-voltage converter circuit 41 has a capacitor connected between the inverting input terminal and the output terminal of the operational amplifier. The inverting input terminal of the operational amplifier is grounded through pyroelectric element 2. The non-inverting input terminal of the operational amplifier is grounded through a reference voltage source for setting the operating point of the operational amplifier to the above-described reference voltage level. The reference voltage level is an analog ground voltage. The reference voltage source is configured to generate an analog ground voltage from output of a bandgap reference circuit and to output the analog ground voltage, as an example. The output terminal of the operational amplifier is connected to voltage amplifier circuit 42. In human body detecting device 1, when person 100 moves on a center line between two infrared ray reception paths 70 adjacent to each other in the right-and-left direction as shown in FIG. 5B, if the body axis of person 100 inclines with respect to vertical line V1 orthogonal to the center line and passing through person 100, an output signal of pyroelectric element 2 tends to change. Besides, in human body detecting device 1, when person 100 moves from the outside of detection area 7 toward human body detecting device 1, a period of the "+" sign of a voltage signal and that of the "−" tend to appear alternately in response to a shake of the body axis of person 100.

Voltage amplifier circuit 42 amplifies a voltage signal in a given frequency band (e.g., 0.1 Hz to 10 Hz) of the voltage signals output from current-voltage converter circuit 41 and outputs the resulting signal.

In the meantime, in human body detecting device 1 of the embodiment, determination device 5 is a microprocessor, and thus signal processing circuit 4 includes an analog-to-digital convertor (A/D converter) 43. A/D converter 43 is configured to convert an analog voltage signal output from voltage amplifier circuit 42 to a digital voltage signal and to output the resulting signal.

Determination device 5 includes first comparing unit 51 that compares first threshold TH1 (refer to FIG. 7) with the level of a voltage signal output from signal processing circuit 4, second comparing unit 52 that compares second threshold TH2 (refer to FIG. 7) lower than first threshold TH1 with the level of the voltage signal output from signal processing circuit 4, and determination unit 53. Determination unit 53 is configured to output a human body detection signal when first comparing unit 51 determines that the level of the voltage signal has exceeded first threshold TH1. Determination unit 53 is configured to output a human body detection signal when determination time T1 (time from when second comparing unit 52 determines that the level of the voltage signal has exceeded second threshold TH2 until when second comparing unit 52 determines so next time) falls within a set time given several times continuously. This allows human body detecting device 1 to increase the sensitivity.

The term "the level of a voltage signal" means the absolute value of an instantaneous value of a voltage signal output from signal processing circuit 4. First threshold TH1 and second threshold TH2 are absolute values. Second threshold TH2 is favorably set to a value between ½ and ⅓ of first threshold TH1 for example. In human body detecting device 1 of the embodiment, first threshold TH1 is set to 0.6 V; second threshold TH2 is set to 0.3 V as an example. The phrase "the level of a voltage signal has exceeded first threshold TH1" means that the level of a voltage signal output from signal processing circuit 4 has changed from a level lower than first threshold TH1 to a level higher than first threshold TH1. The phrase "the level of a voltage signal has exceeded second threshold TH2" means that the level of a voltage signal output from signal processing circuit 4 has changed from a level lower than second threshold TH2 to a level higher than second threshold TH2. Set time T1 is set based on the cycle of a voltage signal when person 100 has entered the inside of detection area 7 while walking from the outside of detection area 7 toward human body detecting device 1 at a speed of 0.5 m/s. The term "the cycle of a voltage signal" is a representative value determined by an experimental result. Set time T1 is set to 3 seconds as an example. The number of the given several times is set to two as an example.

Maximum detection distance L1 described above changes depending on the value of first threshold TH1 as well. Maximum detection distance L1 is longer for lower first threshold TH1; shorter for higher.

In human body detecting device 1, determination device 5 is configured to perform a detecting process using first threshold TH1 and second threshold TH2 to increase the sensitivity without impairing the detection accuracy. In more detail, determination device 5 is configured to perform a detecting process based on chronological change of the level of a voltage signal output from signal processing circuit 4 only when the level of the voltage signal is lower than first threshold TH1.

First threshold TH1 is set in advance based on a voltage signal when person 100 has crossed infrared ray reception path 70 inside detection area 7. In other words, first threshold TH1 is for detecting crossing. Second threshold TH2 is set in advance based on a voltage signal when person 100 has entered the inside of detection area 7 while walking from the outside of detection area 7 toward human body detecting device 1. In other words, second threshold TH2 is for detecting approach. Second threshold TH2 is set to a value higher than the level of stationary noise.

Determination device 5 can be implemented by making a computer (e.g., a microprocessor) execute a given program. The given program is only required to be stored in a computer memory for example. Determination device 5 has a counter used for timing set time T1. This counter may be one built in the computer. The given program is for making the computer function as determination device 5 used for human body detecting device 1. Thus, the computer implements determination device 5 used for human body detecting device 1 by being made execute the given program. In more detail, the given program is for making the computer function as first comparing unit 51, second comparing unit 52, and determination unit 53 of determination device 5 used for human body detecting device 1.

Figure 8:
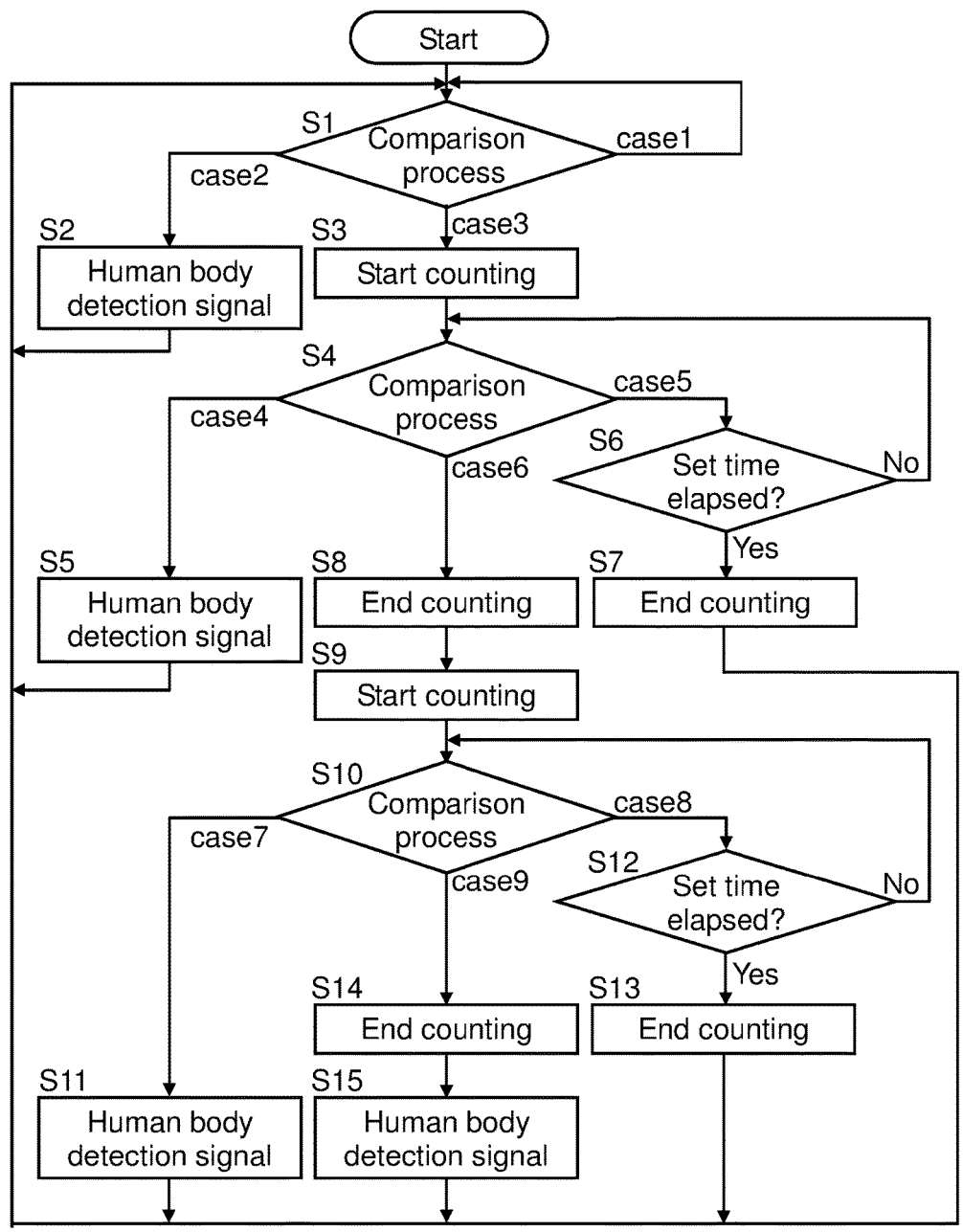
FIG. 8 is a flowchart illustrating the operation of the determination device of the human body detecting device.

The algorithm of the detecting process by determination device 5 is described based on the flowchart shown in FIG. 8. The term "the detecting process" means a process of detecting a person inside detection area 7 based on a voltage signal output from signal processing circuit 4.

Determination device 5 executes a comparison process that compares the level of a voltage signal output from signal processing circuit 4 with first threshold TH1 and second threshold TH2 (S1). Determination device 5, if determining that the level of a voltage signal is equal to or lower than second threshold TH2 in S1 (case 1), continues the comparison process. Determination device 5, if determining that the level of the voltage signal has exceeded first threshold TH1 in S1 (case 2), outputs a human body detection signal (S2) and the process returns to S1. Determination device 5, if determining that the level of the voltage signal is higher than second threshold TH2 and at the same time is not higher than first threshold TH1 in S1 (case 3), causes the counter to start the counting operation (S3). In FIG. 7, the level of a voltage signal has exceeded second threshold TH2 at time point t1.

Determination device 5, even after starting the counting operation in S3, executes the comparison process that compares the level of a voltage signal output from signal processing circuit 4 with first threshold TH1 and second threshold TH2 (S4). Determination device 5, if determining that the level of the voltage signal has exceeded first threshold TH1 in S4 (case 4), outputs a human body detection signal (S5) and the process returns to S1. Determination device 5, if determining that the level of the voltage signal is equal to or lower than second threshold TH2 in S4 (case 5), and if the count value of the counter has not reached a value corresponding to the set time (No in S6), continues the comparison process (S4). Meanwhile, determination device 5, if the count value of the counter has reached a value corresponding to the set time (Yes in S6), ends the counting operation of the counter, zero-reset the count value (S7), and the process returns to S1.

Determination device 5, if determining that the level of the voltage signal is higher than second threshold TH2 and at the same time is not higher than first threshold TH1 in S4 (case 6), makes the counter end the counting operation, resets the count value (S8), and starts the counting operation (S9). In FIG. 7, the level of the voltage signal has exceeded second threshold TH2 at time point t2. Thus in FIG. 7, the time from time point t1 to time point t2 is determination time T1.

Determination device 5 executes the comparison process that compares the level of the voltage signal output from signal processing circuit 4 with first threshold TH1 and second threshold TH2 even after starting the counting operation by the counter in S9 (S10). If determined in S10 that the level of the voltage signal has exceeded first threshold TH1 (case 7), determination device 5 outputs a human body detection signal (S11), and the process returns to S1. If determined in S10 that the level of the voltage signal is equal to or lower than second threshold TH2 (case 8), and if the count value of the counter has not reached a value corresponding to the set time (No in S12), continues the comparison process (S10). Meanwhile, if the count value of the counter has reached a value corresponding to the set time (Yes in S12), determination device 5 ends the counting operation of the counter, zero-resets the count value (S13), and the process returns to S1.

Determination device 5, if determining that the level of the voltage signal is higher than second threshold TH2 and at the same time is not higher than first threshold TH1 in S10 (case 9), makes the counter end the counting operation, resets the count value (S14), and outputs a human body detection signal (S15), and the process returns to S1. In FIG. 7, the level of the voltage signal has exceeded second threshold TH2 at time point t3. Thus in FIG. 7, the time from time point t2 to time point t3 is determination time T1.

Human body detecting device 1 can be applied to a wiring accessory for example. Examples of a wiring accessory include a built-in wiring accessory having a power terminal, a load terminal, and a switching element connected between the power terminal and the load terminal, and used with an external circuit connected between the power terminal and the load terminal. The external circuit is a series circuit of a power supply (e.g., a commercial power supply) and a control-target load. The wiring accessory on/off-controls the switching element based on the presence or absence of a human body detection signal from human body detecting device 1 to on/off-control the load. The control-target load can be a lighting load or a ventilating fan for example.

In a wiring accessory with its control-target load being a lighting load, the lighting load can be lit on or off in response to the presence or absence of a person by preliminarily setting the detection area of human body detecting device 1 in a room where the lighting load is placed.

Examples of human body detecting device 1 include various types of devices, besides a wiring accessory, such as a TV set, digital signage (electronic signboard), lighting appliance, air cleaner, air conditioner, copy machine, facsimile, and security device. They may be either indoor- or outdoor-installed.

Figure 9:
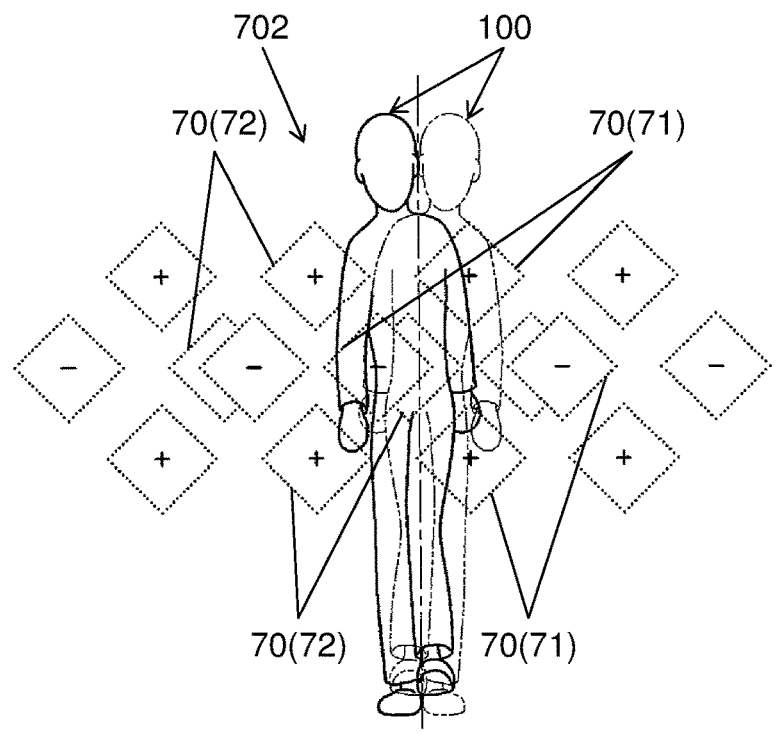
FIG. 9 illustrates infrared ray reception paths of the human body detecting device according to the first modified example the first embodiment.

In the first modified example of a human body detecting device according to the first embodiment, the amount of overlapping between one first infrared ray reception path 71 and one second infrared ray reception path 72 is increased from that (refer to FIG. 5B) of human body detecting device 1 according to the first embodiment as shown in FIG. 9. The basic configuration of the human body detecting device of the first modified example is the same as that of human body detecting device 1 of the first embodiment, with the exception of the design of lens array 3.

In the human body detecting device of the first modified example, the gap between adjacent infrared ray reception paths 70 on second virtual plane 702 can be made smaller than human body detecting device 1 of the first embodiment, which facilitates detecting person 100 moving to a small degree.

Figure 10:
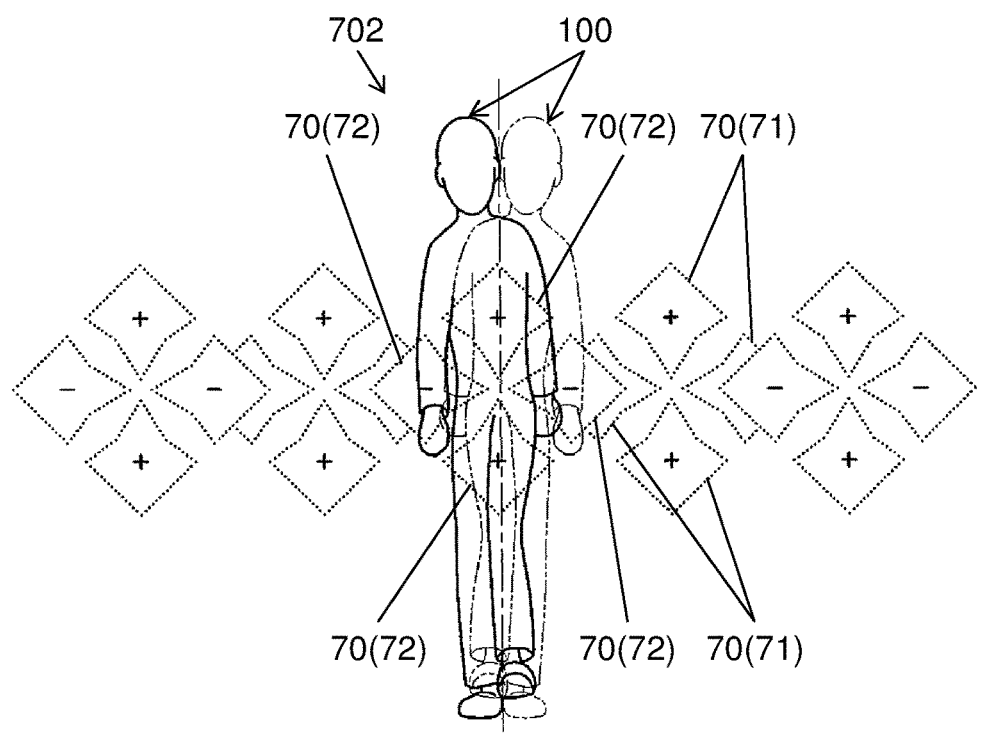
FIG. 10 illustrates infrared ray reception paths of the human body detecting device according to the second modified example the first embodiment.

A second modified example of the human body detecting device according to the first embodiment is one where the shape of infrared ray reception path 70 on second virtual plane 702 is more distorted in the periphery than in the central portion as shown in FIG. 10. The basic configuration of the human body detecting device of the second modified example of the first embodiment is the same as that of human body detecting device 1 of the first embodiment, with the exception of the design of lens array 3. In the human body detecting device of the second modified example of the first embodiment, lens 30 of lens array 3 is an aspheric lens designed to positively have a barrel-shaped distortion. The term "an aspheric lens designed to positively have a barrel-shaped distortion" means an aspheric lens designed to have a barrel-shaped distortion for achieving a desired shape of infrared ray reception path 70 for example.

In the human body detecting device of the second modified example of the first embodiment, the gap between adjacent infrared ray reception paths 70 on second virtual plane 702 can be made smaller than that of human body detecting device 1 of the first embodiment, which facilitates detecting person 100 moving to a small degree.

Figure 11:
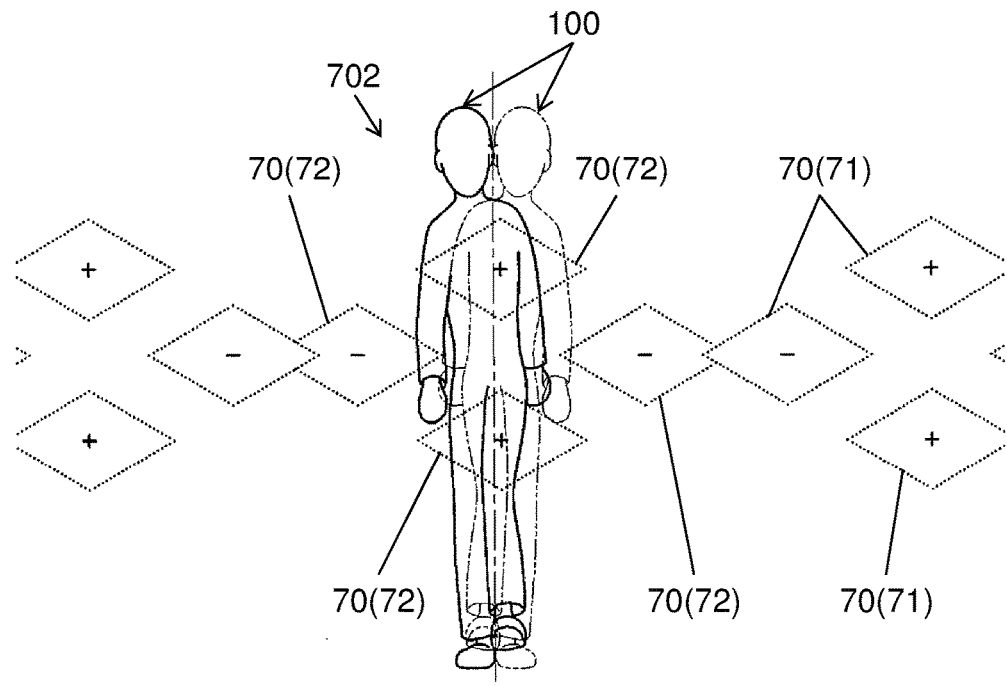
FIG. 11 illustrates infrared ray reception paths of the human body detecting device according to the third modified example the first embodiment.

A third modified example of the human body detecting device according to the first embodiment is one where the shape of infrared ray reception path 70 on second virtual plane 702 is a diamond with its two diagonal lines different in length from each other as shown in FIG. 11. The basic configuration of the human body detecting device of the third modified example of the first embodiment is the same as that of human body detecting device 1 of the first embodiment, with the exception of the design of lens array 3.

In the third modified example of human body detecting device according to the first embodiment, the shape of lens 30 determining infrared ray reception path 70 is set so that the front-view shape of infrared ray reception path 70 is non-similar to the front-view shape (the planar-view shape) of detecting unit 24.

Figure 12:
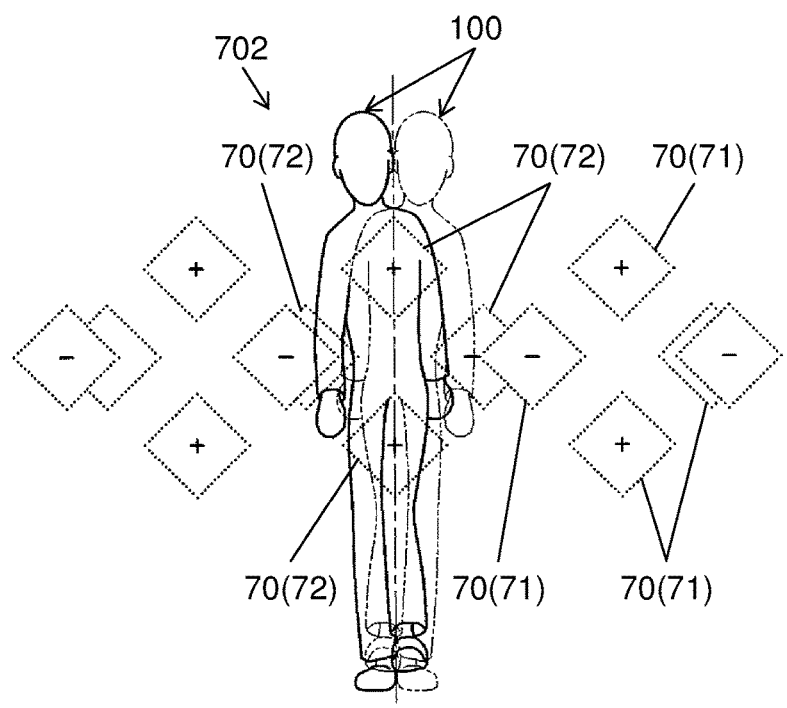
FIG. 12 illustrates infrared ray reception paths of the human body detecting device according to the fourth modified example the first embodiment.

A fourth modified example of the human body detecting device according to the first embodiment is one where the amount of overlapping between two infrared ray reception paths 70 changes in size alternately in the direction in which two infrared ray reception paths 70 overlapping with each other are placed as shown in FIG. 12. The basic configuration of the human body detecting device of the fourth modified example of the first embodiment is the same as that of human body detecting device 1 of the first embodiment, with the exception of the design of lens array 3.

The fourth modified example of human body detecting device according to the first embodiment detects person 100 with their body axis shaking to a small degree more easily than human body detecting device 1 of the first embodiment.

Figure 13A:
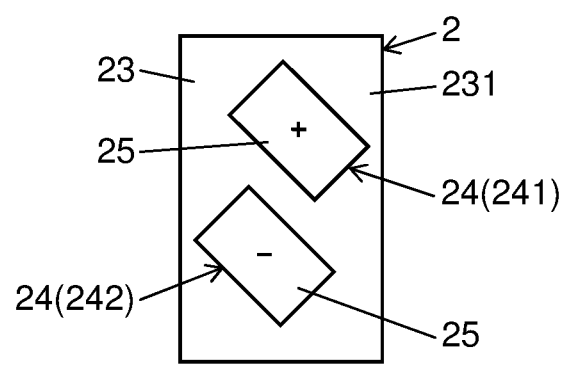
FIG. 13A is an outline plan view of an infrared ray reception path of the human body detecting device according to the fifth modified example the first embodiment.
Figure 13B:
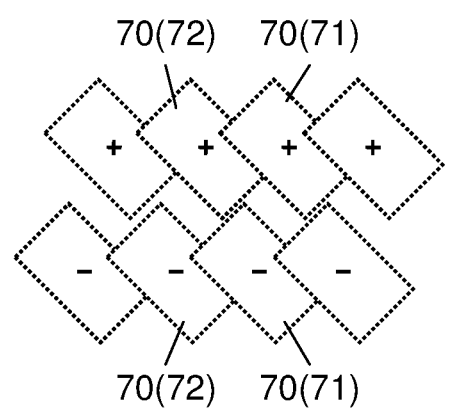
FIG. 13B illustrates infrared ray reception paths of the same human body detecting device.
Figure 14:
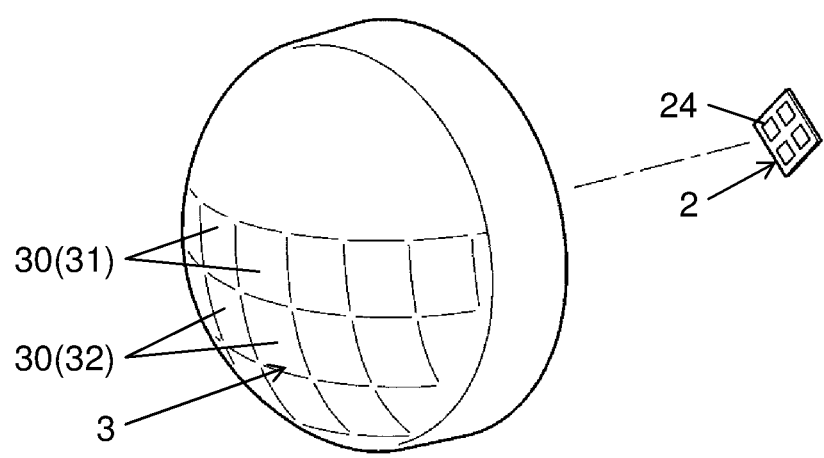
FIG. 14 is an outline perspective view of the pyroelectric element and the lens array of the human body detecting device according to the second embodiment of the present disclosure.
Figure 15A:
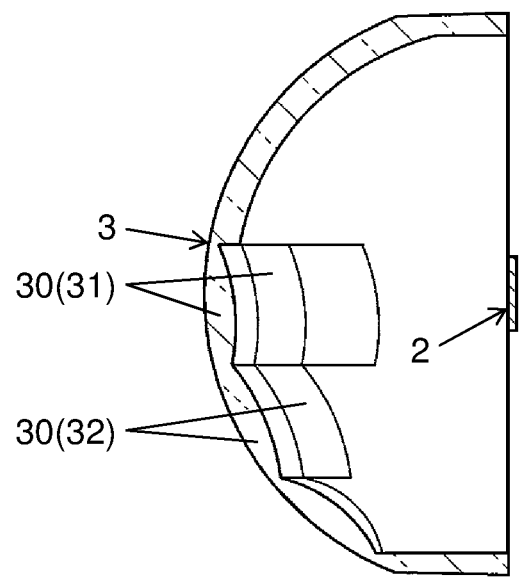
FIG. 15A is an outline longitudinal sectional view of the pyroelectric element and the lens array in the same human body detecting device.
Figure 15B:
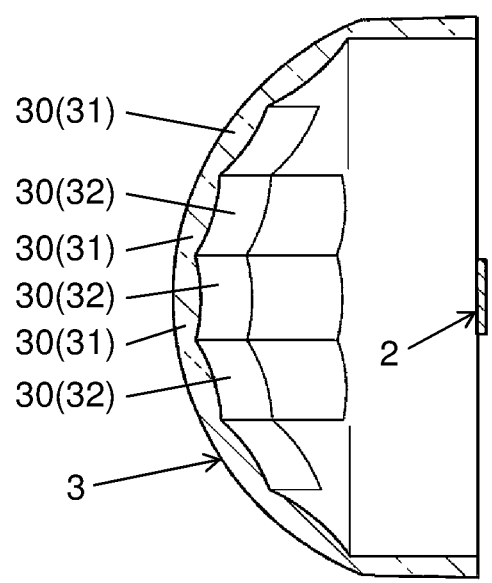
FIG. 15B is an outline transverse cross-sectional view of the pyroelectric element and the lens array in the same human body detecting device.

A fifth modified example of the human body detecting device according to the first embodiment is one where pyroelectric element 2 is a dual element equipped with two detecting units 24 as shown in FIG. 13A, and first infrared ray reception path 71 and second infrared ray reception path 72 overlap with each other as shown in FIG. 13B. The basic configuration of the fifth modified example of human body detecting device is the same as that of human body detecting device 1 according to the first embodiment. The dual element as pyroelectric element 2 includes two detecting units 24: first detecting unit 241 with the polarity of front-side electrode 25 positive; and second detecting unit 242 with the polarity of front-side electrode 25 negative. The dual element has two detecting units 24 connected in reverse parallel with each other. One first infrared ray reception path 71 and one second infrared ray reception path 72 overlapping with each other correspond to the same one of multiple detecting units 24.

Second Exemplary Embodiment

Hereinafter, a description is made of a human body detecting device according to this embodiment based on FIGS. 14, 15A, 15B, and 16. The basic configuration of the human body detecting device is the same as human body detecting device 1 according to the first embodiment, with the exception of the shape of lens array 3. A component of the human body detecting device according to this embodiment same as that of human body detecting device 1 according to the first embodiment is given the same reference mark and its description is omitted.

In lens array 3 of the human body detecting device according to the embodiment, multiple lenses 30 are arranged in two lines in a predetermined direction along first diagonal line 201 of rectangular photosensitive surface 20 of pyroelectric element 2. This allows the human body detecting device according to the embodiment to reduce variations in the sensitivity and the detection accuracy due to the height of person 100.

Multiple lenses 30 include multiple first lenses 31 arranged along one of the two lines and multiple second lenses 32 arranged along the other line.

Hence, in the human body detecting device according to the embodiment, some sets of four infrared ray reception paths 70 defined by pyroelectric element 2 and one lens 30 are arranged in two lines in a predetermined direction. In more detail, as many sets as first lenses 31 of four infrared ray reception paths 70 defined by pyroelectric element 2 and one first lens 31 are arranged along one line in a predetermined direction. Also, as many sets as second lenses 32 of four infrared ray reception paths 70 defined by pyroelectric element 2 and one second lens 32 are arranged along the other line in the predetermined direction.

Figure 16:
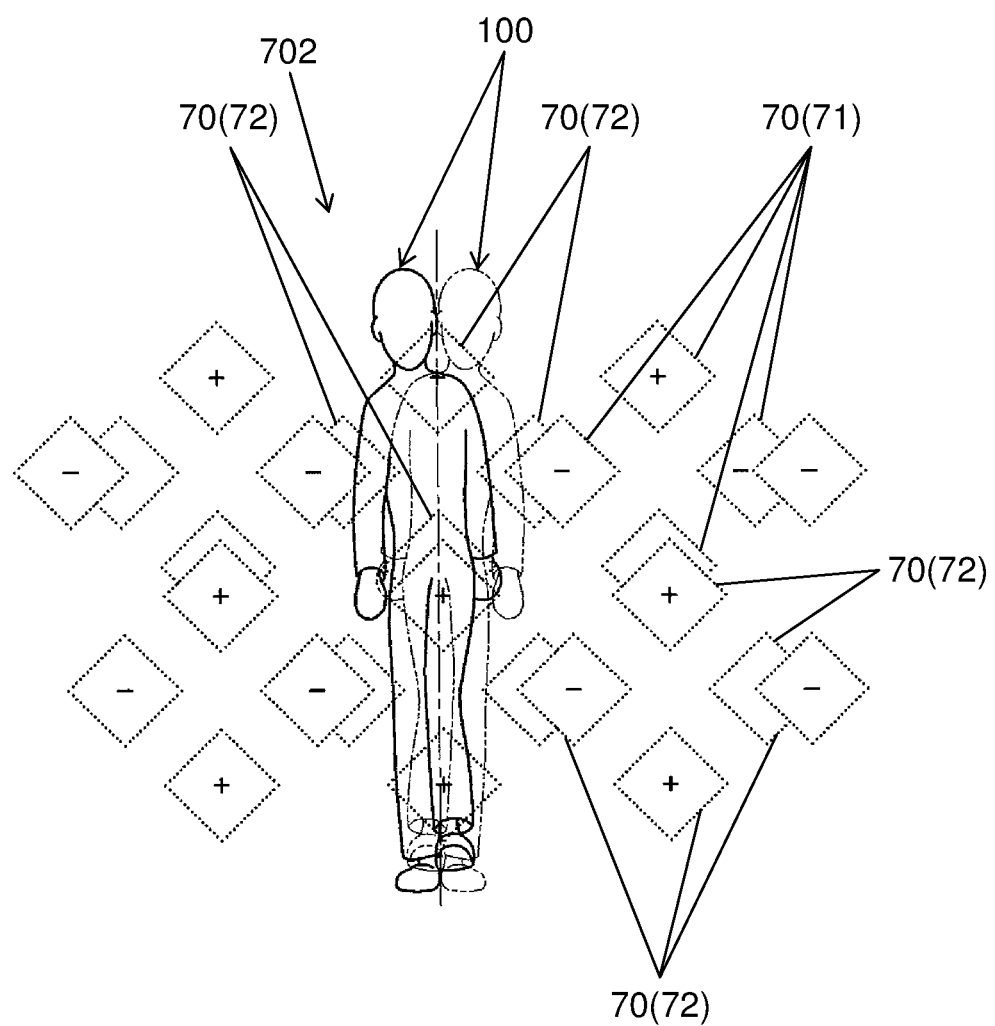
FIG. 16 illustrates infrared ray reception paths of the same human body detecting device.

In the human body detecting device according to the embodiment, multiple infrared ray reception paths 70 on second virtual plane 702 have a positional relationship as shown in FIG. 16. In more detail, in the human body detecting device according to the embodiment, lens array 3 is configured so that two infrared ray reception paths 70 with negative polarity overlap with each other in a predetermined direction (right-and-left), and two infrared ray reception paths 70 with positive polarity overlap with each other in a direction (up-and-down) orthogonal to the predetermined direction. This allows the human body detecting device according to the embodiment to detect person 100 with their body axis shaking to a small degree more easily.

Multiple lenses 30 of lens array 3 are only required to be arranged in lines in a predetermined direction along first diagonal line 201 of rectangular photosensitive surface 20 of pyroelectric element 2.

Multiple lenses 30 are only required to include multiple first lenses 31 arranged in one of adjacent two lines among multiple lines and multiple second lenses 32 arranged in the other of the adjacent two lines among multiple lines.

Figure 17:
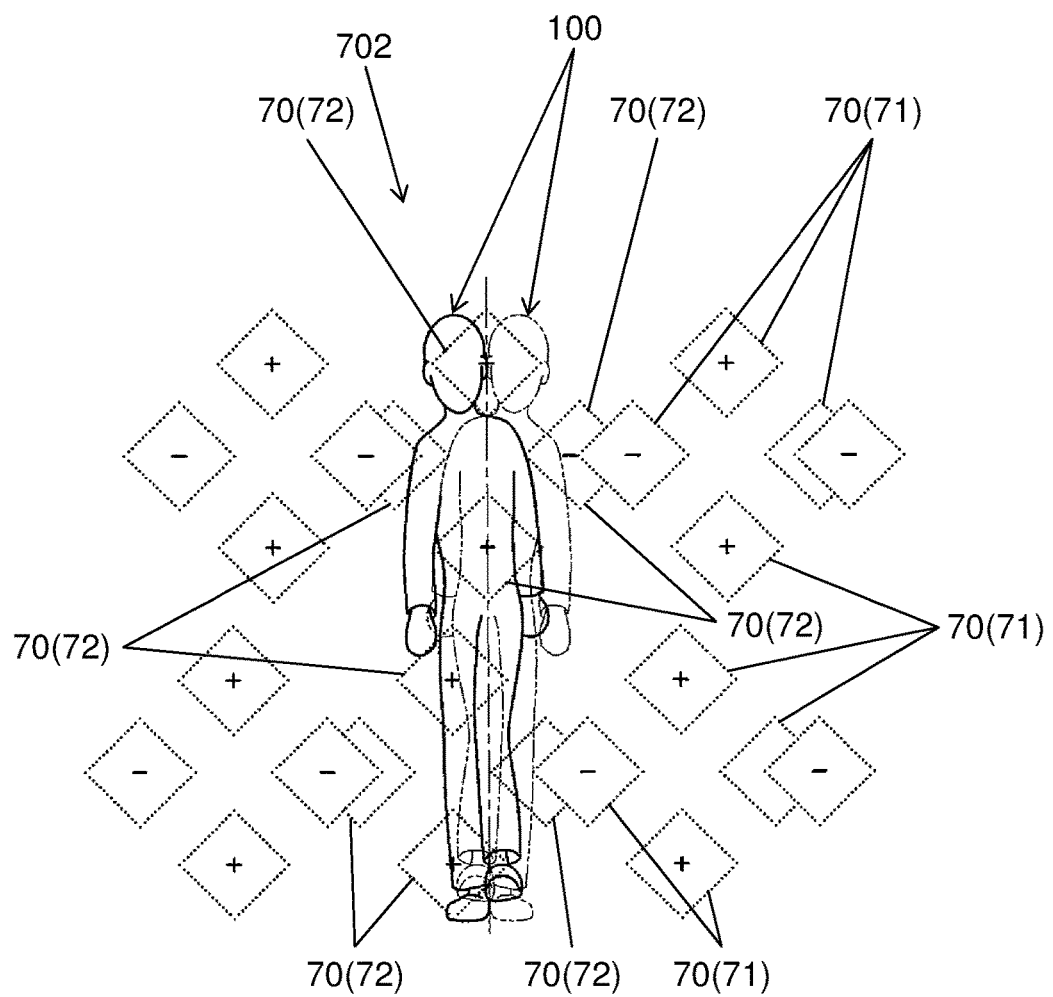
FIG. 17 illustrates infrared ray reception paths of the human body detecting device according to the first modified example of the second embodiment.

A first modified example of the human body detecting device according to the second embodiment is one shown in FIG. 17. The basic configuration of the first modified example according to the second embodiment is substantially the same as the human body detecting device according to the second embodiment, with the exception of the design of lens array 3. In the first modified example, lens array 3 is configured so that infrared ray reception paths 70 do not overlap with one another in a direction (up-and-down) orthogonal to the predetermined direction.

Multiple lenses 30 include multiple first lenses 31 arranged in one of two lines and multiple second lenses 32 arranged in the other of the two lines. Lens array 3 is configured so that a group of infrared ray reception paths 70 defined by respective multiple first lenses 31 and multiple detecting units 24, of multiple infrared ray reception paths 70 is displaced from a group of infrared ray reception paths 70 defined by respective multiple second lenses 32 and multiple detecting units 24, in a predetermined direction (right-and-left direction). This allows the first modified example according to the second embodiment to detect person 100 with their body axis shaking to a small degree more easily than the human body detecting device according to the second embodiment. In short, the first modified example increases the sensitivity of detecting person 100 independently of an angle of the approach of person 100 to detection area 7 (refer to FIG. 4) when person 100 moves from the outside of detection area 7 toward human body detecting device 1. Here, "an angle of approach" means an angle formed by normal line H1 (refer to FIG. 5A) and a straight line along a direction in which person 100 approaches detection area 7 on a horizontal plane containing normal line H1 passing through center 200 of photosensitive surface 20 of pyroelectric element 2. In other words, "an angle of approach" means an angle formed by the center line of detection area 7 and a direction in which person 100 approaches detection area 7, in a planar view.

Figure 18:
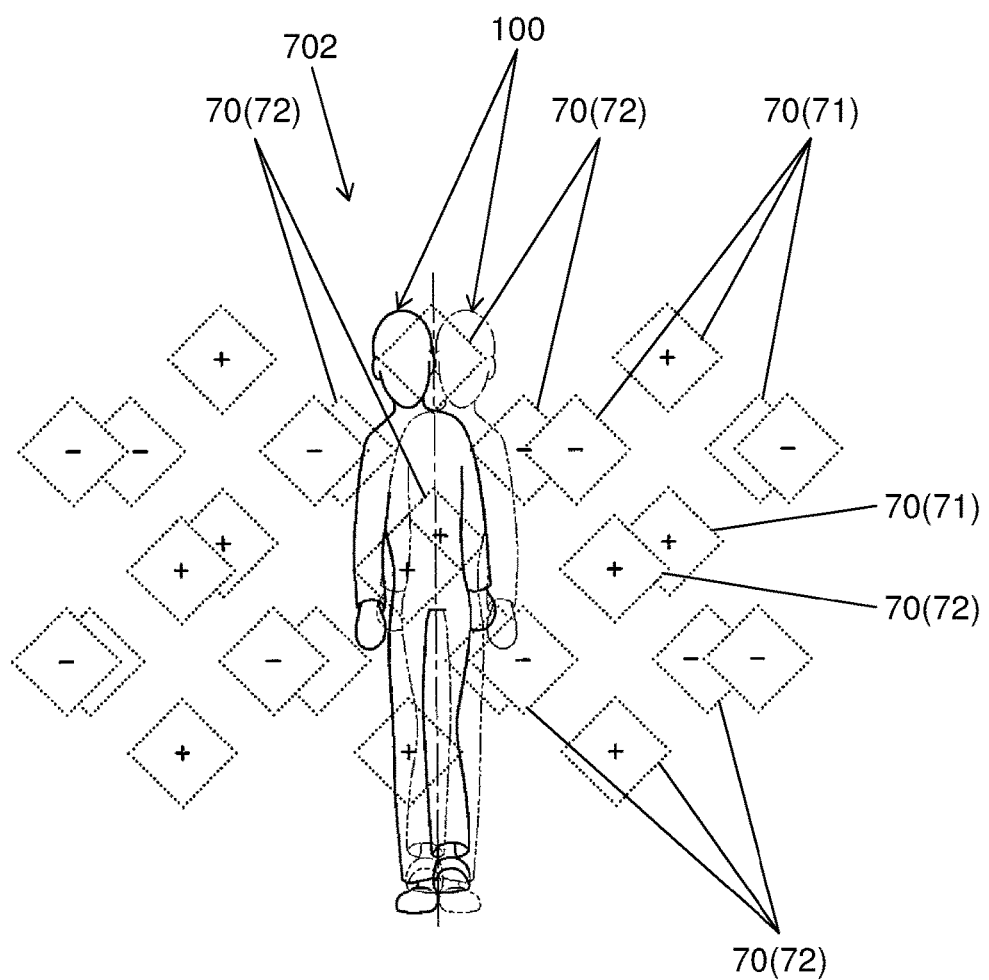
FIG. 18 illustrates infrared ray reception paths of the human body detecting device according to the second modified example of the second embodiment.

A second modified example of the human body detecting device according to the second embodiment is one where the amount of overlapping between two infrared ray reception paths 70 in the respective sets changes in size alternately in the direction in which two infrared ray reception paths 70 are placed as shown in FIG. 18. The basic configuration of the second modified example according to the second embodiment is the same as that of the first, with the exception of the design of lens array 3.

The second modified example of the human body detecting device according to the second embodiment detects person 100 with their body axis shaking to a small degree more easily than the human body detecting device of the second embodiment. In the second modified example, sets of four infrared ray reception paths 70 defined by pyroelectric element 2 and one lens 30 are arranged in two lines in a predetermined direction. The vertical center line of the square encompassing the upper four infrared ray reception paths 70 is displaced from the vertical center line of the square encompassing the lower four infrared ray reception paths 70, in a predetermined direction. This allows the second modified example to increase the sensitivity of detecting person 100 independently of an angle of approach of person 100 to detection area 7 (refer to FIG. 4) when person 100 moves from the outside of detection area 7 toward the human body detecting device.

Third Exemplary Embodiment

Figure 19:
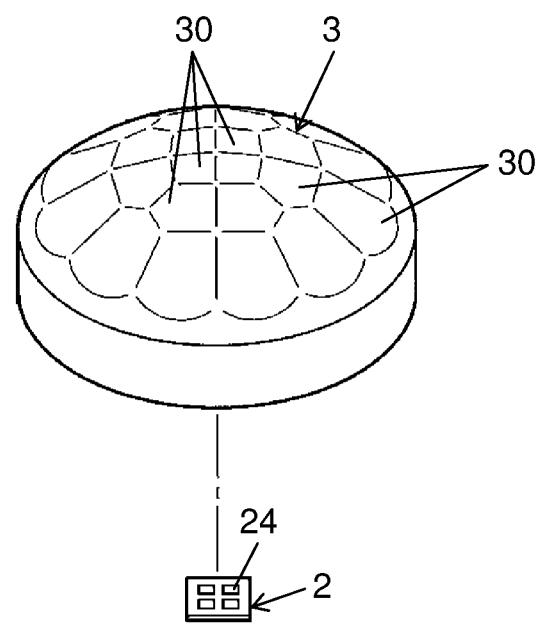
FIG. 19 is an outline perspective view of the pyroelectric element and the lens array of a human body detecting device according to the third embodiment of the present disclosure.
Figure 21:
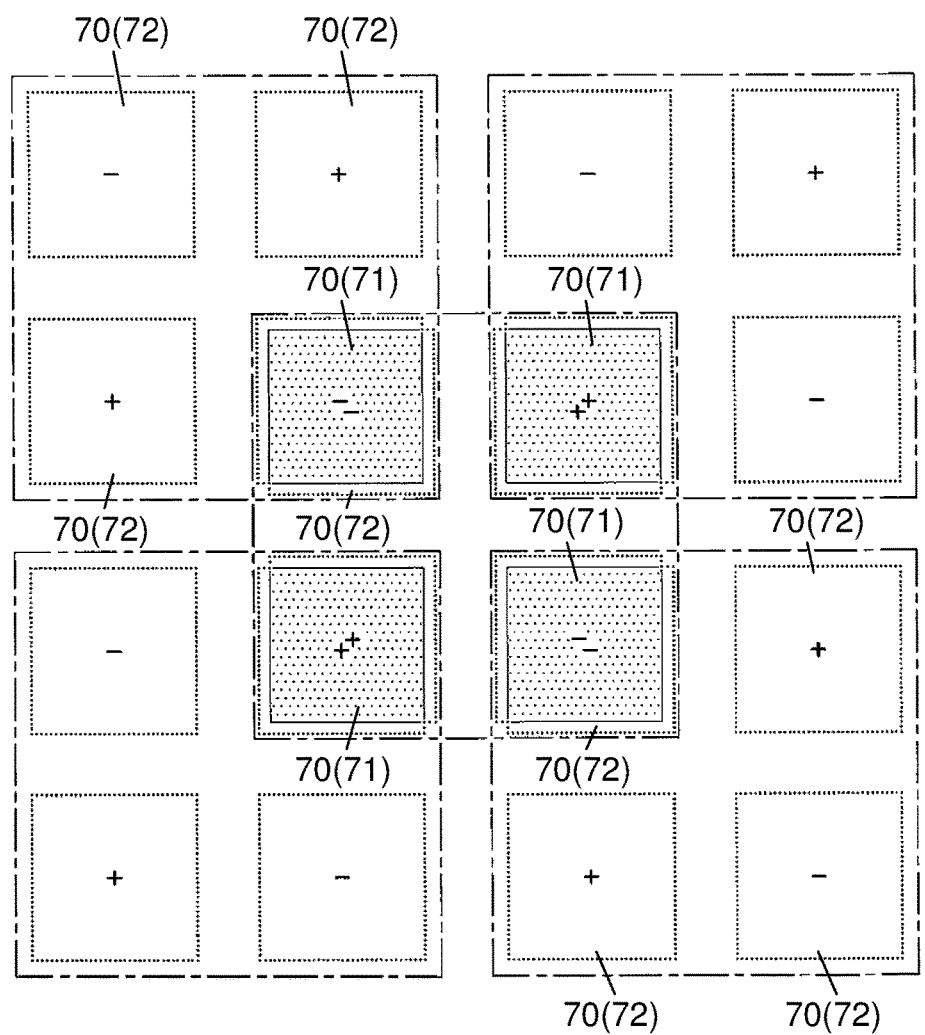
FIG. 21 illustrates infrared ray reception paths of the same human body detecting device.

Hereinafter, a description is made of a human body detecting device according to this embodiment based on FIGS. 19 through 21. The basic configuration of the human body detecting device is the same as human body detecting device 1 according to the first embodiment, with the exception of the shape of lens array 3. A component of the human body detecting device according to this embodiment same as that of human body detecting device 1 according to the first embodiment is given the same reference mark and its description is omitted.

Lens array 3 of the human body detecting device according to the embodiment is a domical fly-eye lens. This allows the human body detecting device to increase the sensitivity when applied to a wiring accessory built in a ceiling for example.

Materials, numeric values, and other conditions described in the first through third embodiments are favorable examples and are not intended to limit the scope of the present disclosure. Modifications can be appropriately added and combinations can be appropriately made within a scope that does not deviate from the technical concept of the present disclosure.

For example, determination device 5 shown in FIG. 1 may be configured as follows. First comparing unit 51 is composed of a first reference power supply and a first comparator; second comparing unit 52 is composed of a second reference power supply and a second comparator; and determination unit 53 is composed of a clock pulse generation circuit, a counter, a control circuit, and a determination circuit. The first reference power supply is configured to output first threshold TH1. The first comparator compares the level of the voltage signal output from signal processing circuit 4 with first threshold TH1. The second reference power supply is configured to output second threshold TH2. The second comparator compares the level of a voltage signal output from signal processing circuit 4 with second threshold TH2. The clock pulse generation circuit is configured to output clock pulses with a constant cycle. The counter counts clock pulses. The control circuit is configured to control starting and stopping of the counting operation of the counter and zero-resetting a count value. The determination circuit is configured to determine the presence or absence of a person inside detection area 7 based on a first output signal output from the first comparator, a second output signal output from the second comparator, and determination time T1 calculated from a count value of the counter. The determination circuit is also configured to output a human body detection signal when determining the presence of a person inside detection area 7. In this case, A/D converter 43 of signal processing circuit 4 is unnecessary.

Pyroelectric element 2 shown in FIG. 1 is not limited to a pyroelectric element that is used in the current detection mode and outputs a current signal as an output signal, but may be a pyroelectric element that is used in the voltage detection mode and outputs a voltage signal as an output signal. In this case, current-voltage converter circuit 41 is unnecessary.

An algorithm for the detecting process by determination device 5 is not limited to that described based on FIG. 8. For example, determination device 5 may be configured to compare the level of a voltage signal output from signal processing circuit 4 with a given threshold (first threshold TH1) to output a human body detection signal when determining that the level of the voltage signal has exceeded the given threshold. In this case, determination device 5 may be achieved by making a computer execute a given program, or may be configured by a window comparator for example. The given threshold is the same as first threshold TH1 for example. Maximum detection distance L1 changes depending on the value of the given threshold as well.

In each of multiple lenses 30 of lens array 3 shown in FIG. 5A, its focal length opposite to pyroelectric element 2 may be made different from other as appropriate. Each of multiple lenses 30 of lens array 3 may be other than an aspheric lens.

REFERENCE MARKS IN THE DRAWINGS

1 human body detecting device
2 pyroelectric element
3 lens array
4 signal processing circuit
5 determination device
20 photosensitive surface
24 detecting unit
25 front-side electrode
30 lens
31 first lens
32 second lens
51 first comparing unit
52 second comparing unit
53 determination unit
70 infrared ray reception path
71 first infrared ray reception path
71 second infrared ray reception path
201 first diagonal line
202 second diagonal line
TH1 first threshold
TH2 second threshold
T1 determination time

The invention claimed is:
1. A human body detecting device comprising:
a pyroelectric element;
a lens array having a plurality of lenses collecting infrared rays to the pyroelectric element; and
a determiner outputting a human body detection signal based on an output signal of the pyroelectric element,
wherein the pyroelectric element includes a plurality of detecting units each having a front-side electrode and a back-side electrode,
wherein the pyroelectric element includes a first detecting unit with polarity of the front-side electrode positive and a second detecting unit with polarity of the front-side electrode negative, as the plurality of detecting units,
wherein a plurality of infrared ray reception paths is defined by one lens and the plurality of detecting units in one-to-one correspondence to the plurality of detecting units for each of the plurality of lenses, wherein the plurality of infrared ray reception paths includes a plurality of first infrared ray reception paths defined by any one of the plurality of lenses and the plurality of detecting units; and
a plurality of second infrared ray reception paths defined by one lens adjacent to the any one of the plurality of lenses and the plurality of detecting units,
wherein the lens array is configured so that one of the plurality of first infrared ray reception paths and one of the plurality of second infrared ray reception paths overlap with each other, and
wherein the front-side electrodes of two detecting units respectively corresponding to the one first infrared ray reception path and the one second infrared ray reception path overlapping with each other, of the plurality of detecting units have same polarity.

2. The human body detecting device of claim 1, wherein the lens array is configured so that part of the one first infrared ray reception path and part of the one second infrared ray reception path overlap with each other.

3. The human body detecting device of claim 1,
wherein the pyroelectric element is a quad element including four detecting units disposed in an array of 2 by 2 as the plurality of detecting units,
wherein the pyroelectric element has a rectangular photosensitive surface encompassing each of the front-side electrodes of the plurality of detecting units in a planar view,
wherein two detecting units disposed along a first diagonal line of the rectangular photosensitive surface, of the four detecting units disposed in an array of 2 by 2 are connected in parallel with each other,
wherein two detecting units disposed along a second diagonal line of the rectangular photosensitive surface, of the four detecting units disposed in an array of 2 by 2 are connected in parallel with each other,
wherein two detecting units disposed in a row direction, of the four detecting units disposed in an array of 2 by 2 are connected in reverse parallel with each other,
wherein two detecting units disposed in a column direction, of the four detecting units disposed in an array of 2 by 2 are connected in reverse parallel with each other,
wherein the respective front-side electrodes of the two detecting units disposed in a direction along the first diagonal line have same polarity,
wherein the respective front-side electrodes of the two detecting units disposed in the row direction have polarity different from each other,
wherein the respective front-side electrodes of the two detecting units disposed in the column direction have polarity different from each other, and
wherein the one first infrared ray reception path and the one second infrared ray reception path overlapping with each other correspond to detecting units different from each other, of the plurality of detecting units.

4. The human body detecting device of claim 3,
wherein the plurality of lenses of the lens array are disposed in a line in a predetermined direction along the first diagonal line.

5. The human body detecting device of claim 3, wherein the plurality of lenses of the lens array are disposed in a plurality of lines in a predetermined direction along the first diagonal line.

6. The human body detecting device of claim 5,
wherein the plurality of lenses includes a plurality of first lenses disposed in one line of adjacent two lines of the plurality of lines and a plurality of second lenses disposed in the other line of the adjacent two lines, and
wherein the lens array is configured so that, of the plurality of infrared ray reception paths a group of infrared ray reception paths defined by the respective first lenses and the plurality of detecting units is displaced from a group of infrared ray reception paths defined by the respective second lenses and the plurality of detecting units, in the predetermined direction.

7. The human body detecting device of claim 3, wherein the lens array is a domical fly-eye lens.

8. The human body detecting device of claim 1, further comprising a signal processing circuit processing an output signal of the pyroelectric element and outputting a voltage signal proportional to the output signal,
wherein the determiner is configured to output the human body detection signal based on a level of the voltage signal output from the signal processing circuit,
wherein the determiner includes a first comparing unit comparing a first threshold with the level of the voltage signal, a second comparing unit comparing a second threshold lower than the first threshold with the level of the voltage signal, and a determination unit,
wherein the determination unit is configured to output the human body detection signal when the first comparing unit determines that the level of the voltage signal has exceeded the first threshold, and
wherein the determination unit is configured to output the human body detection signal when determination time falls within a set time given several times continuously, the determination time being time from when the second comparing unit determines that the level of the voltage signal has exceeded the second threshold until when the second comparing unit next time determines that the level of the voltage signal has exceeded the second threshold.

9. The human body detecting device of claim 1, wherein each of the plurality of lenses of the lens array is a convex lens.

10. The human body detecting device of claim 1, wherein the plurality of lenses of the lens array have different optical axis from each other.

11. The human body detecting device of claim 10, wherein the plurality of lenses of the lens array have a same focal point.

12. The human body detecting device of claim 1, wherein the one of the plurality of first infrared ray reception paths and the one of the plurality of second infrared ray reception paths only partially overlap with each other.

* * * * *